(12) United States Patent
Matsushima

(10) Patent No.: US 7,762,543 B2
(45) Date of Patent: Jul. 27, 2010

(54) AUTOMATIC DOCUMENT FEEDER AND IMAGE READING DEVICE

(75) Inventor: Ryoichi Matsushima, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/408,759

(22) Filed: Mar. 23, 2009

(65) Prior Publication Data

US 2009/0243185 A1 Oct. 1, 2009

(30) Foreign Application Priority Data

Mar. 25, 2008 (JP) ............................. 2008-078620

(51) Int. Cl.
*B65H 5/22* (2006.01)

(52) U.S. Cl. ..................... 271/3.14; 271/212; 271/213; 271/220; 271/186; 271/65

(58) Field of Classification Search ................. 271/207, 271/212, 213, 220, 186, 65, 3.14; 399/374
See application file for complete search history.

(56) References Cited

U.S. PATENT DOCUMENTS

| | | | | |
|---|---|---|---|---|
| 4,456,235 A | * | 6/1984 | Colglazier et al. | 271/3.08 |
| 5,596,399 A | * | 1/1997 | Dempsey et al. | 399/45 |
| 6,095,517 A | * | 8/2000 | Dinatale | 271/212 |
| 7,481,427 B2 | * | 1/2009 | Tokutsu | 271/186 |
| 7,558,523 B2 | * | 7/2009 | Wang et al. | 399/367 |
| 2007/0003344 A1 | * | 1/2007 | Lee et al. | 399/374 |
| 2007/0210512 A1 | | 9/2007 | Sakakibara et al. | |
| 2007/0212140 A1 | * | 9/2007 | Xu et al. | 399/367 |

FOREIGN PATENT DOCUMENTS

| | | |
|---|---|---|
| JP | 05-344273 A | 12/1993 |
| JP | 09-211921 A | 8/1997 |
| JP | 2000-233860 | 8/2000 |
| JP | 2006-232460 A | 9/2006 |
| JP | 2007-238252 | 9/2007 |

OTHER PUBLICATIONS

JP Office Action dtd Dec. 1, 2009, JP Appln. 2008-078620, English translation.

* cited by examiner

*Primary Examiner*—David H Bollinger
(74) *Attorney, Agent, or Firm*—Banner & Witcoff, Ltd.

(57) ABSTRACT

An automatic document feeder includes a document tray, an output tray on which the document for which image reading is finished is placed, a roller applying carrying force to the document by rotating and contacting the document, and a movable ejection flap. The ejection flap is movable between a first position where the document for which image reading is finished is sunk into a position between the output tray and a bottom of a document already stacked on the output tray and a second position where the document is ejected on the output tray without being sunk into the position between the output tray and the bottom of the stacked document. The automatic document feeder also includes a switching unit to switch between a first motion of transmitting driving force of a driving source to the movable ejection flap and a second motion of transmitting driving force to the roller.

11 Claims, 17 Drawing Sheets

AUTOMATIC DOCUMENT FEEDER AND IMAGE READING DEVICE

CROSS-REFERENCE TO RELATED APPLICATION

This application claims priority under 35 U.S.C. §119 from Japanese Patent Application No. 2008-078620, filed on Mar. 25, 2008. The entire subject matter of the application is incorporated herein by reference.

BACKGROUND

1. Technical Field

Aspects of the present invention relate to an automatic document feeder and an image reading device.

2. Related Art

Automatic document feeders are widely used for image reading devices. In Japanese Patent Provisional Publication No. 2007-238252A (hereafter, referred to as JP 2007-238252A), an example of an automatic document feeder is disclosed. The automatic document feeder disclosed in JP 2007-238252A is configured to eject a document for which the image reading is finished is stacked on an output tray so as to be sunk into a bottom of stacked documents already stacked on the output tray so that the documents are placed on the output tray in ascending order. More specifically, the automatic document feeder disclosed in JP 2007-238252A is provided with a spring member to lift the rear edge portion of the documents so that sinking ejection can be achieved.

SUMMARY

Incidentally, although the automatic document feeder disclosed in JP 2007-238252A is configured to execute the sinking ejection for the document for which the image reading is finished, the user may want not to execute the sinking ejection. It is understood that by employing a movable ejection flap, it becomes possible to switch between a motion using the sinking ejection and a motion of not using the sinking ejection. However, if such a structure is employed, the following drawbacks may arise.

In general, the automatic document feeder includes a plurality of carrying rollers, and the carrying rollers are driven by a single driving source. Therefore, if the movable flap is employed in such an automatic document feeder, it may become necessary to drive the movable flap in addition to the carrying rollers. Therefore, it becomes also necessary to increase the driving force of the driving source. In this case, it is required to increase the size of the driving source, by which the cost for the automatic document feeder increases.

Aspects of the present invention are advantageous in that an automatic document feeder configured to drive a movable flap without increasing the size of the driving source, and thereby to avoid increase of manufacturing cost.

According to an aspect of the invention, there is provided an automatic document feeder, comprising: a document tray on which a document to be read is placed; an output tray on which the document for which image reading is finished is placed; a roller which applies a carrying force to the document by rotating and contacting the document; a movable ejection flap configured to be movable between a first position where the document for which the image reading is finished is sunk into a position between the output tray and a bottom of a stacked document already stacked on the output tray and a second position where the document is ejected on the output tray without being sunk into the position between the output tray and the bottom of the stacked document; a switching unit configured to switch between a first motion of transmitting a driving force of a driving source to the movable flap and a second motion of transmitting the driving force of the driving source to the roller.

With this configuration, it becomes possible to transmit the driving force to one of the roller and the movable flap. That is, such a configuration makes it possible to prevent both of the roller and the movable flap from being driven simultaneously. Therefore, increase of the size of the driving source can be avoided, and thereby the increase of the manufacturing cost of the ADF can be avoided.

According to another aspect of the invention, there is provided an image reading device, comprising: the above described automatic document feeder; and a reading portion configured to read a document carried to the reading portion.

With this configuration, it becomes possible to transmit the driving force to one of the roller and the movable flap. That is, such a configuration makes it possible to prevent both of the roller and the movable flap from being driven simultaneously. Therefore, increase of the size of the driving source can be avoided, and thereby the increase of the manufacturing cost of the ADF can be avoided.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, an embodiment according to the invention will be described with reference to the accompanying drawings.

Figure 1:
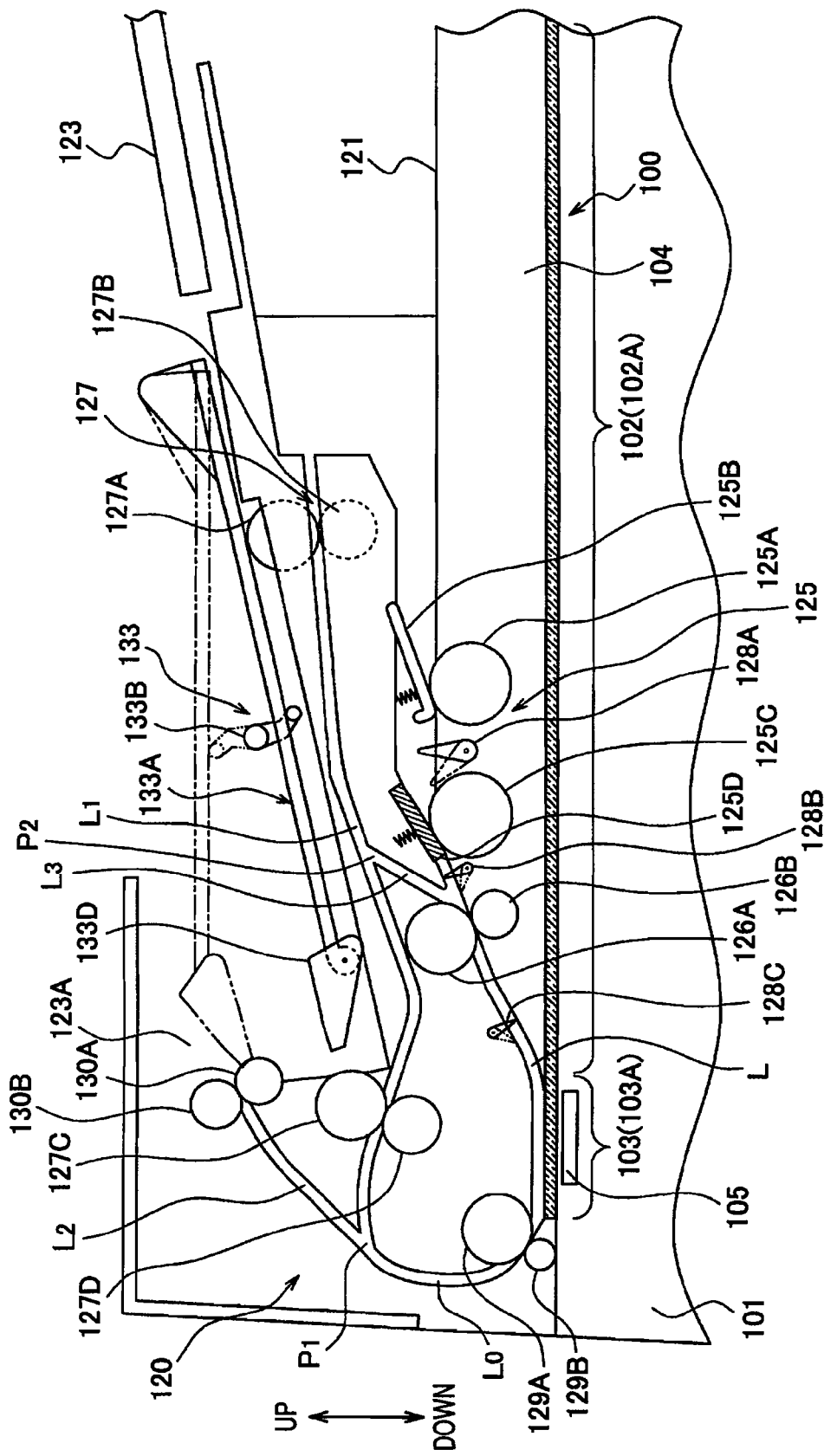
FIG. 1 is a cross-sectional view of an automatic document feeder.
Figure 2:
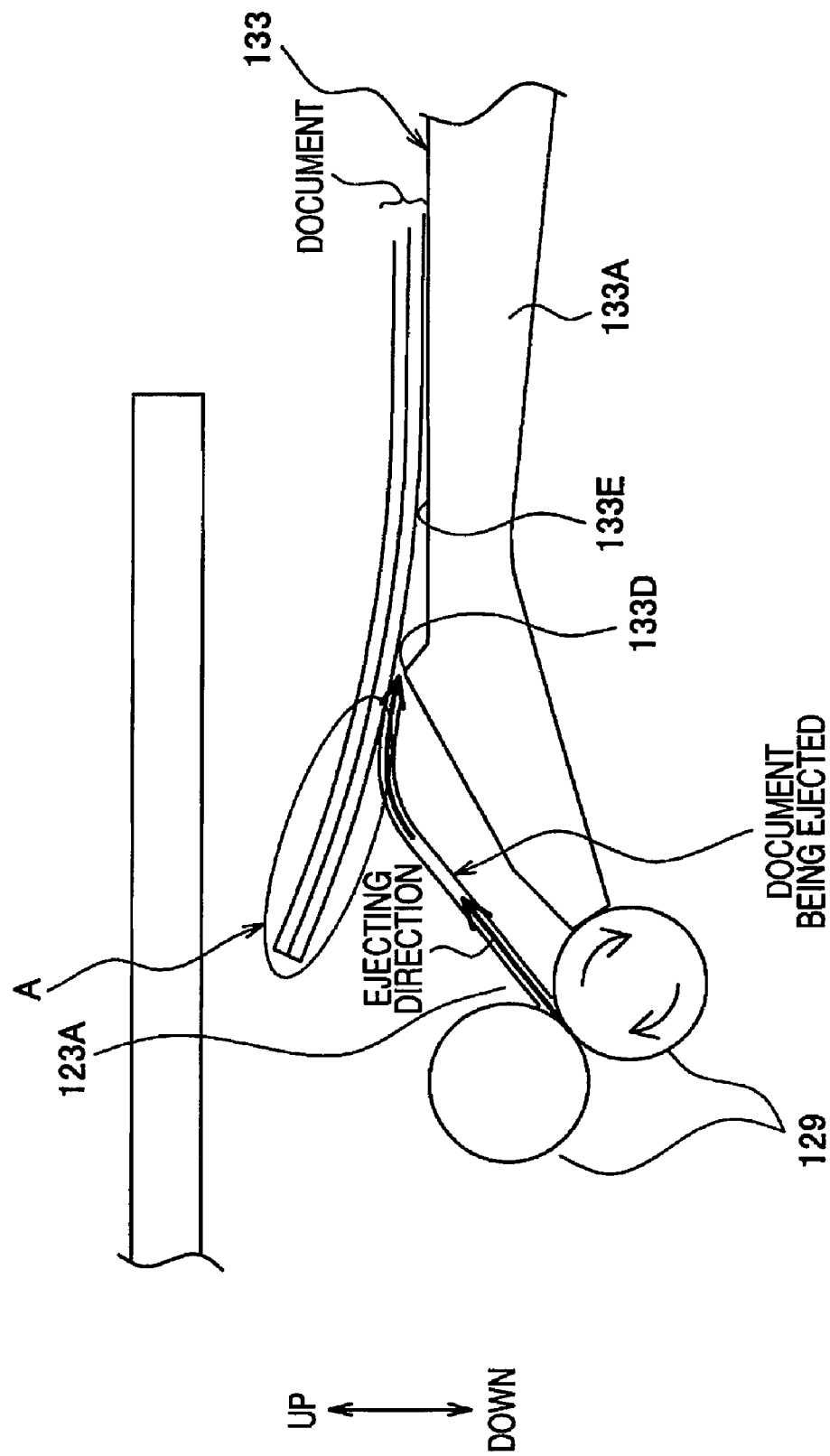
FIG. 2 is an explanatory illustration for explaining an operation of a sinking mechanism.
Figure 3:
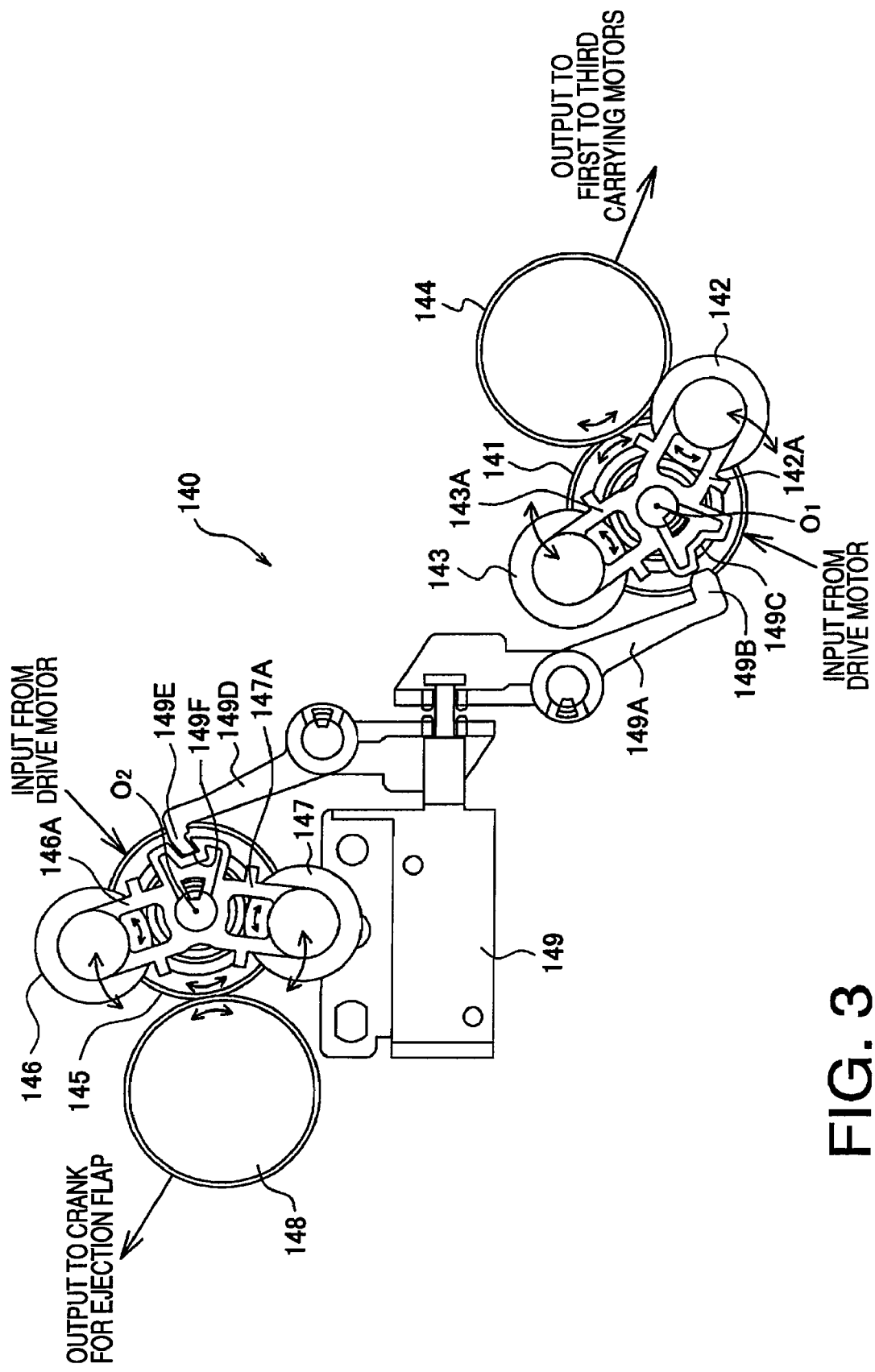
FIG. 3 illustrates a structure of a driving force switching mechanism.
Figure 4:
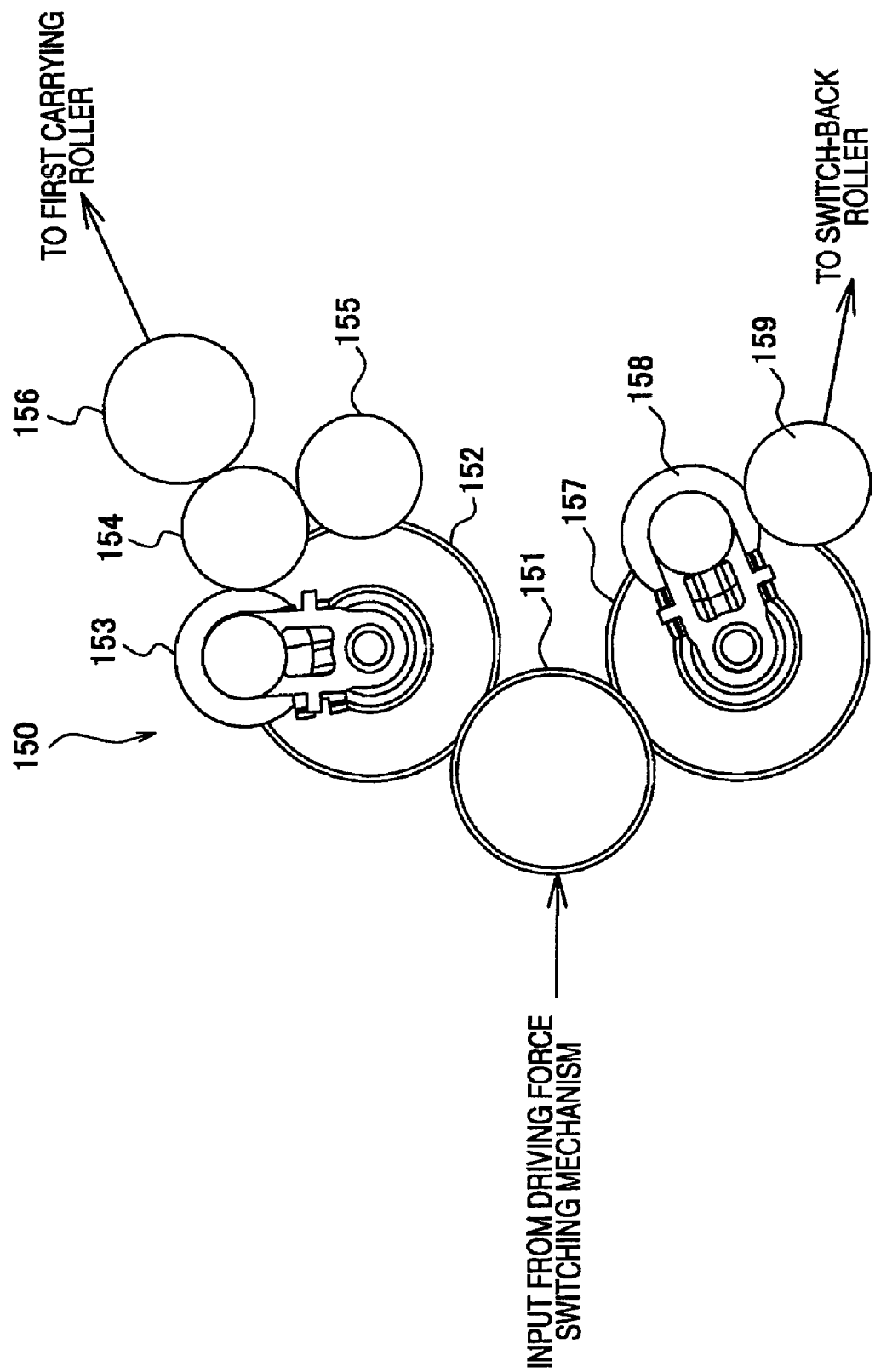
FIG. 4 illustrates a structure of a driving force distributing mechanism.
Figure 5:
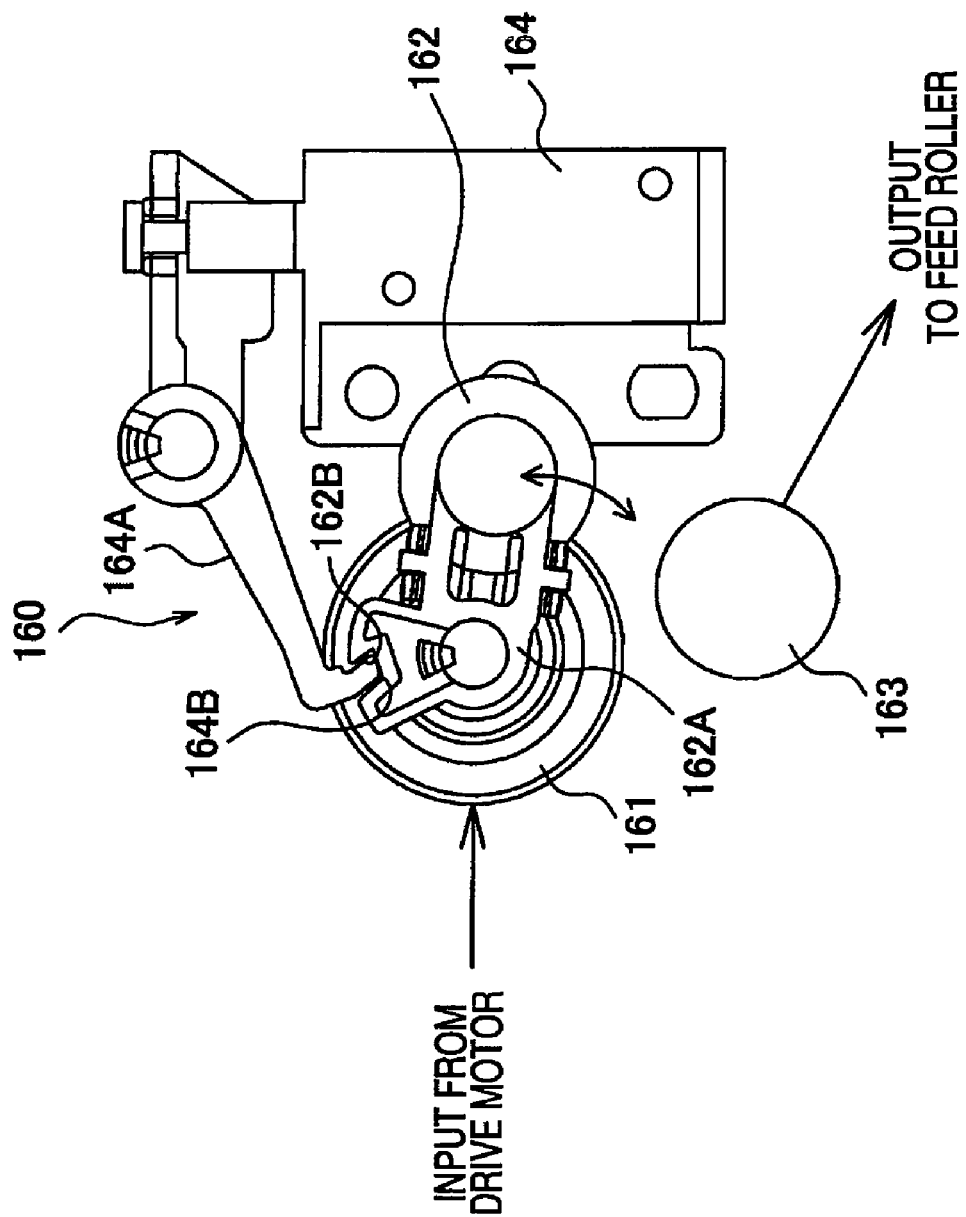
FIG. 5 illustrates a structure of a driving force transmission mechanism.
Figure 6:
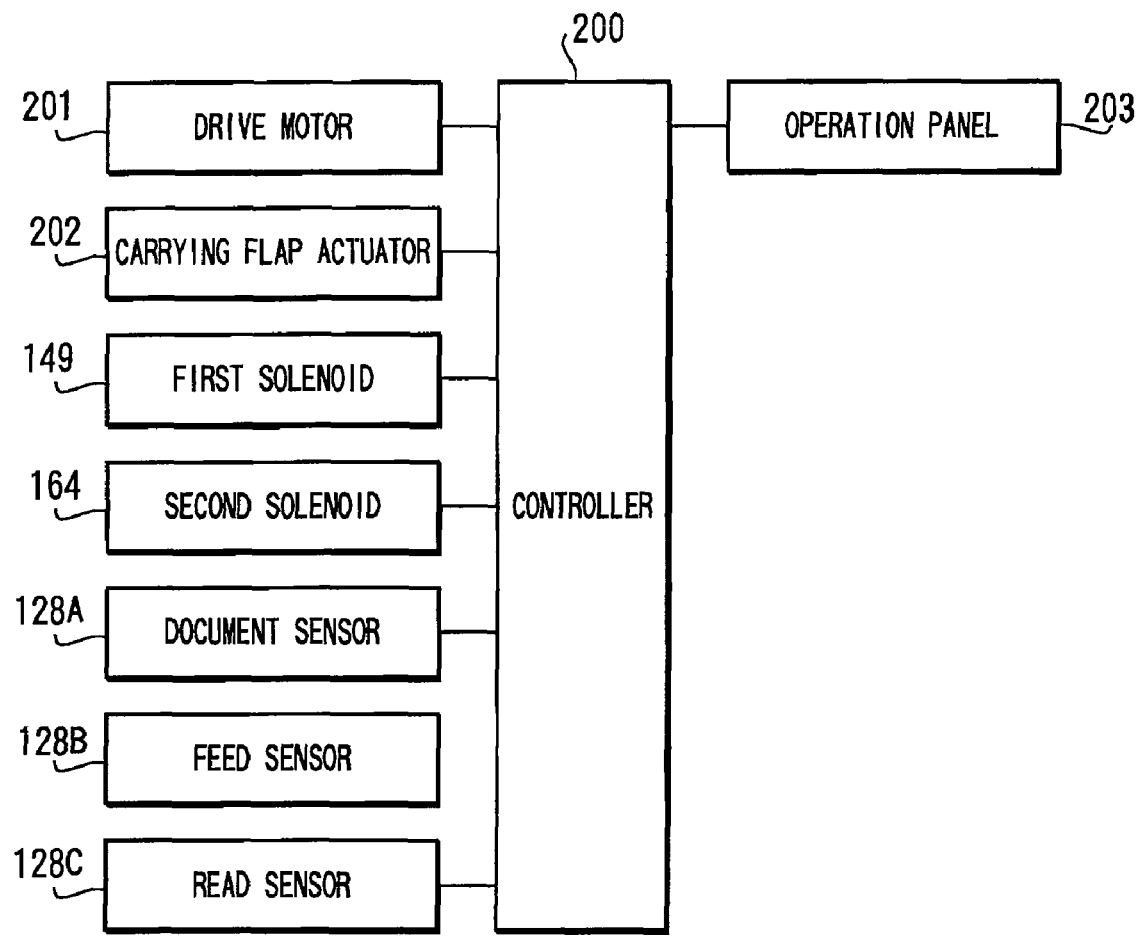
FIG. 6 illustrates a block diagram of a control system of an image reading device.

FIG. 1 is a cross sectional view of an ADF (Automatic Document Feeder) 120 provided in an image reading device 100. FIG. 2 is an explanatory illustration for illustrating an operation of a sinking mechanism 133. FIG. 3 illustrates a driving force switching mechanism 140. FIG. 4 illustrates a driving force distributing mechanism 150. FIG. 5 illustrates a driving force transmission mechanism 160. FIG. 6 is a block diagram of a control system of the ADF 120.

Figure 7:
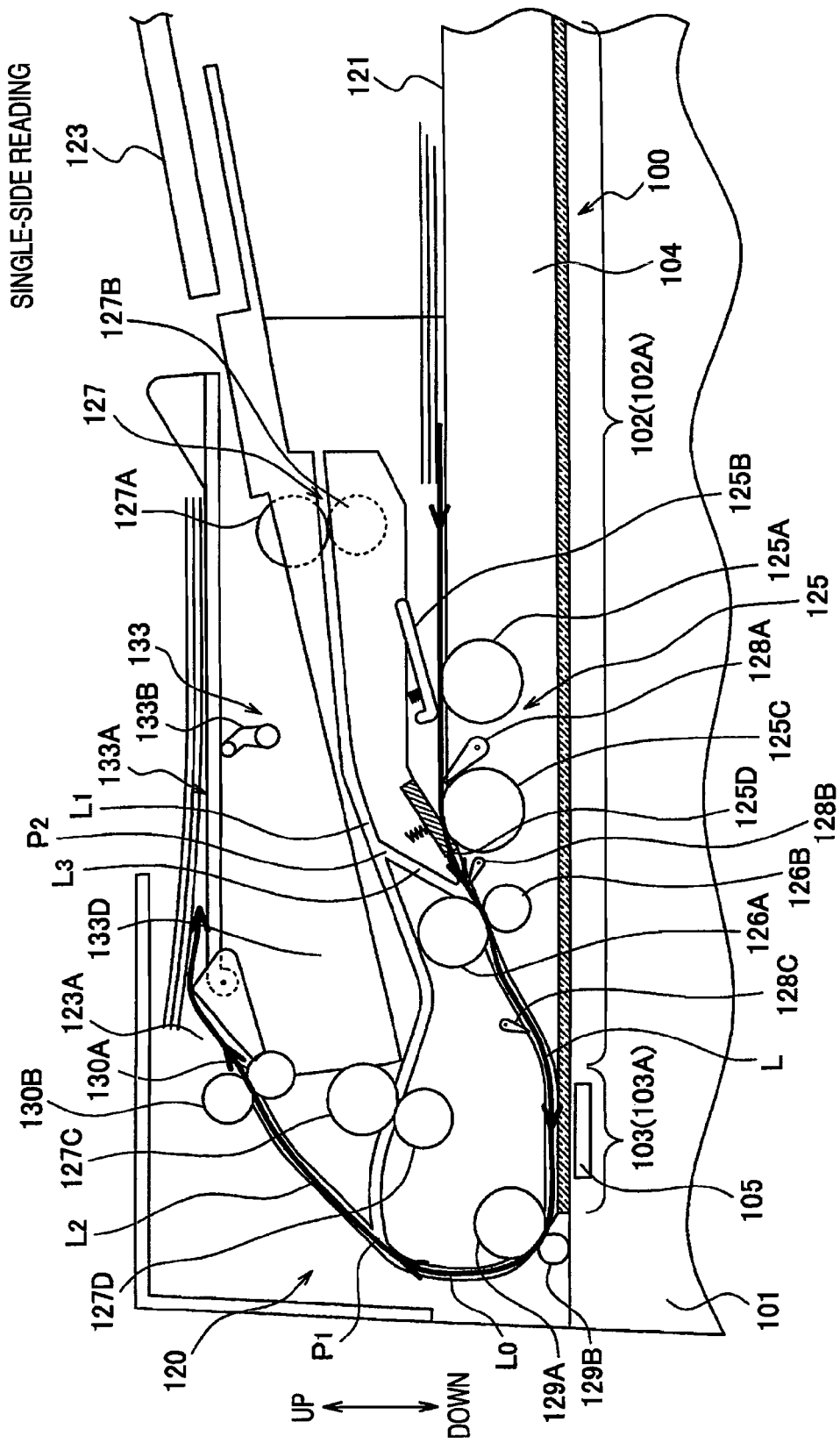
FIGS. 7-9 are explanatory illustrations for explaining carrying operations for carrying a document.
Figure 8:
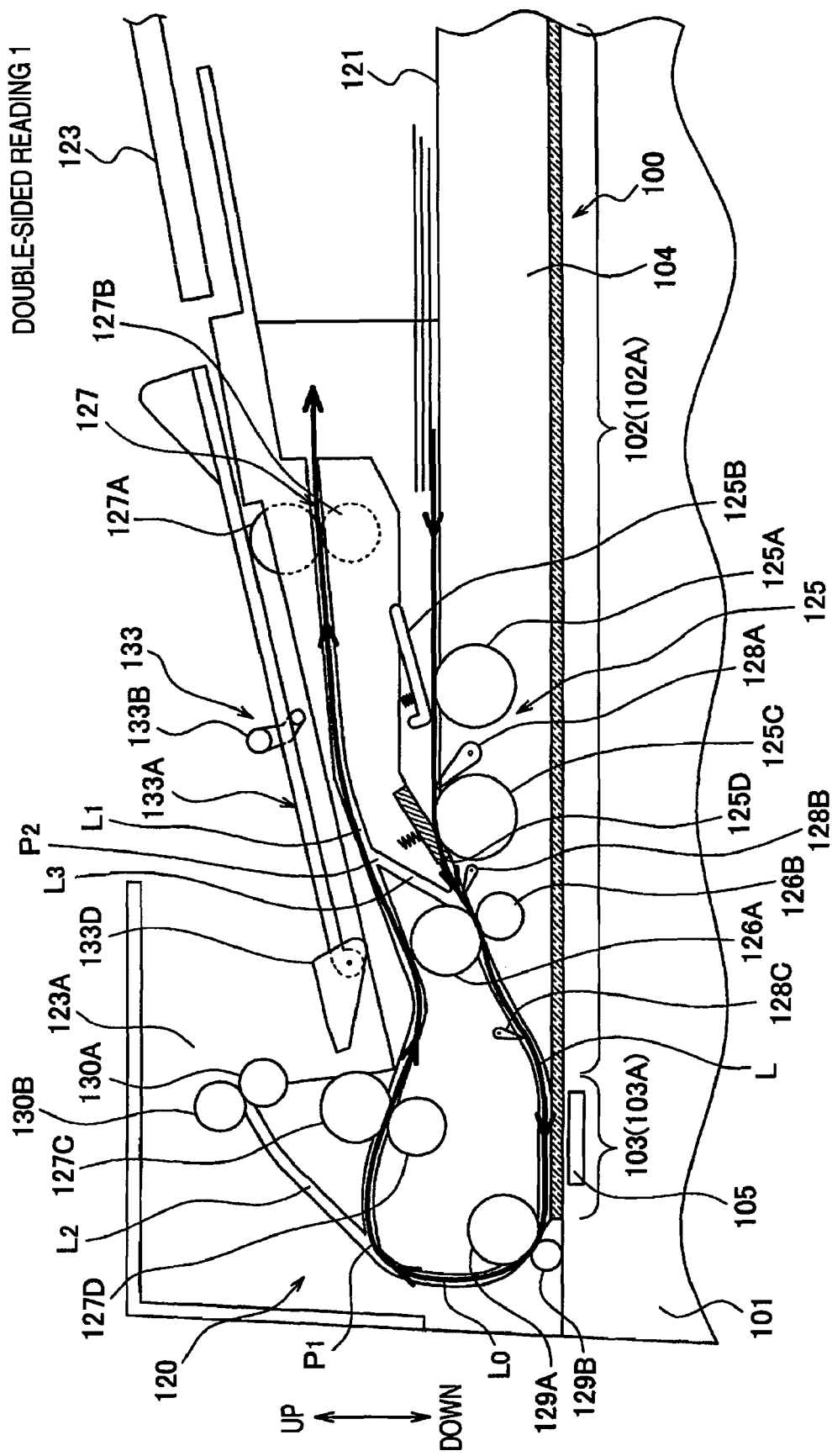
Figure 9:
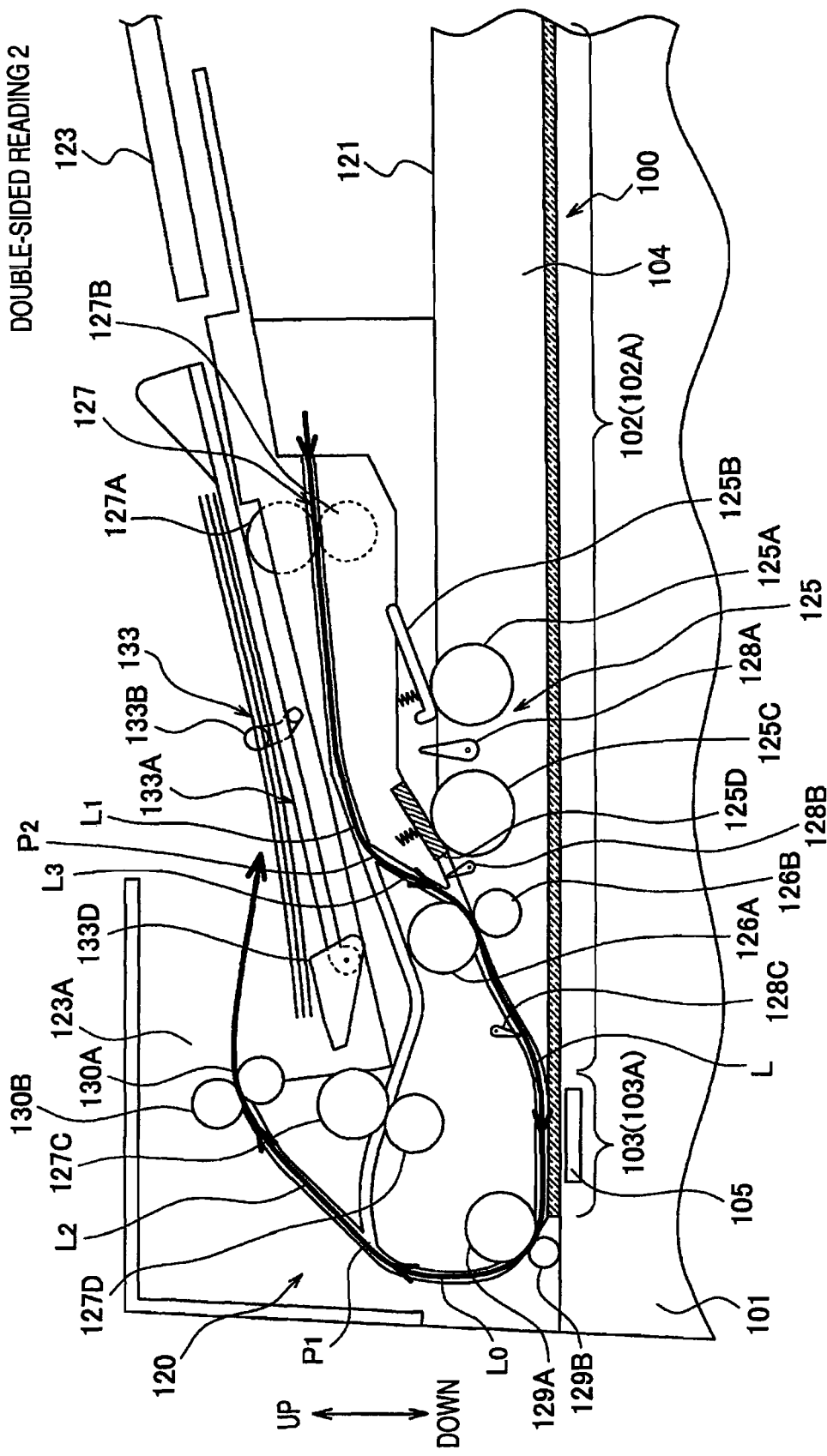
Figure 10:
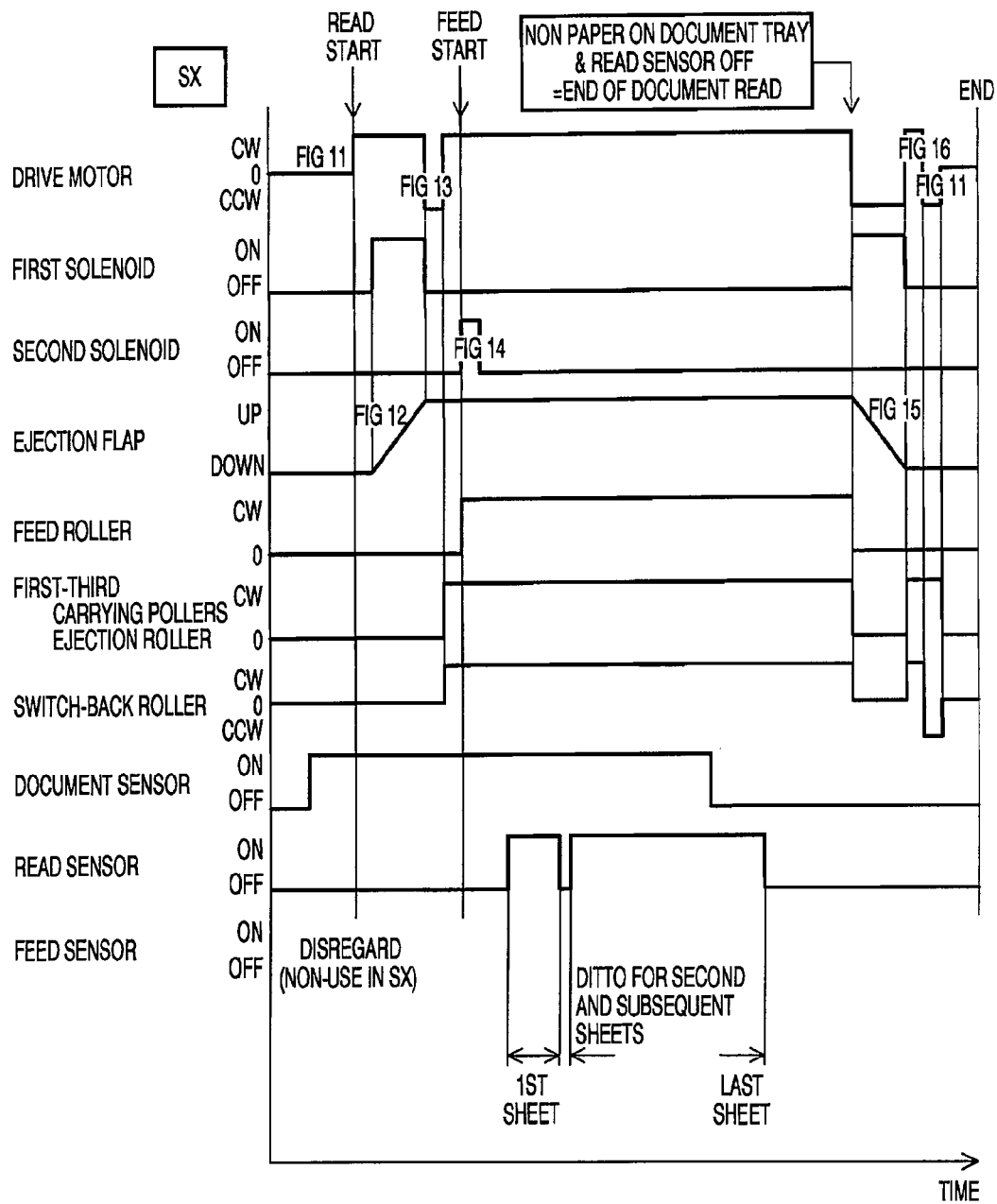
FIG. 10 is a timing chart for explaining a single-side reading mode.
Figure 11:
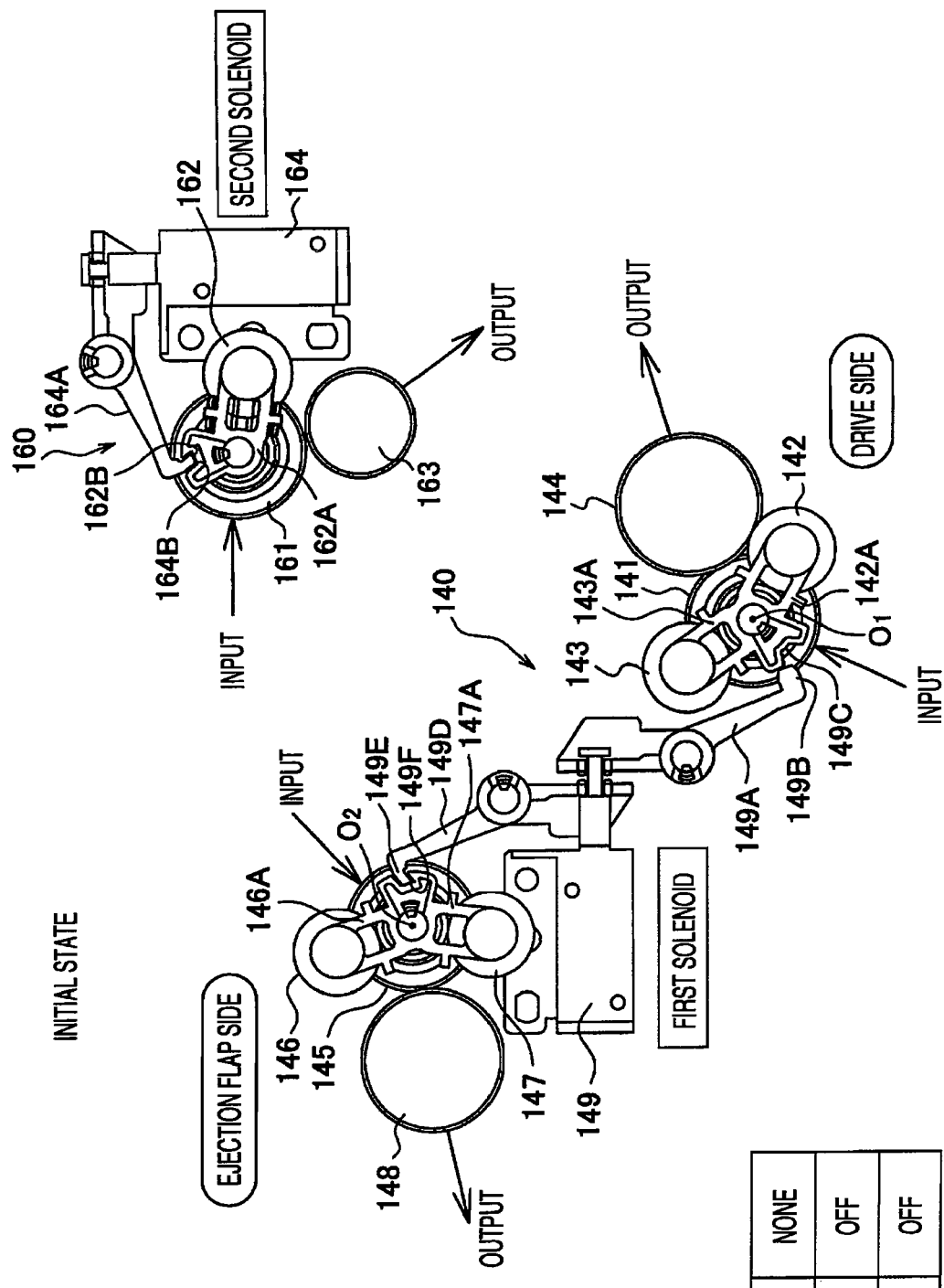
FIGS. 11-16 are explanatory illustrations for explaining operations of the driving force switching mechanism and the driving force transmission mechanism.
Figure 17:
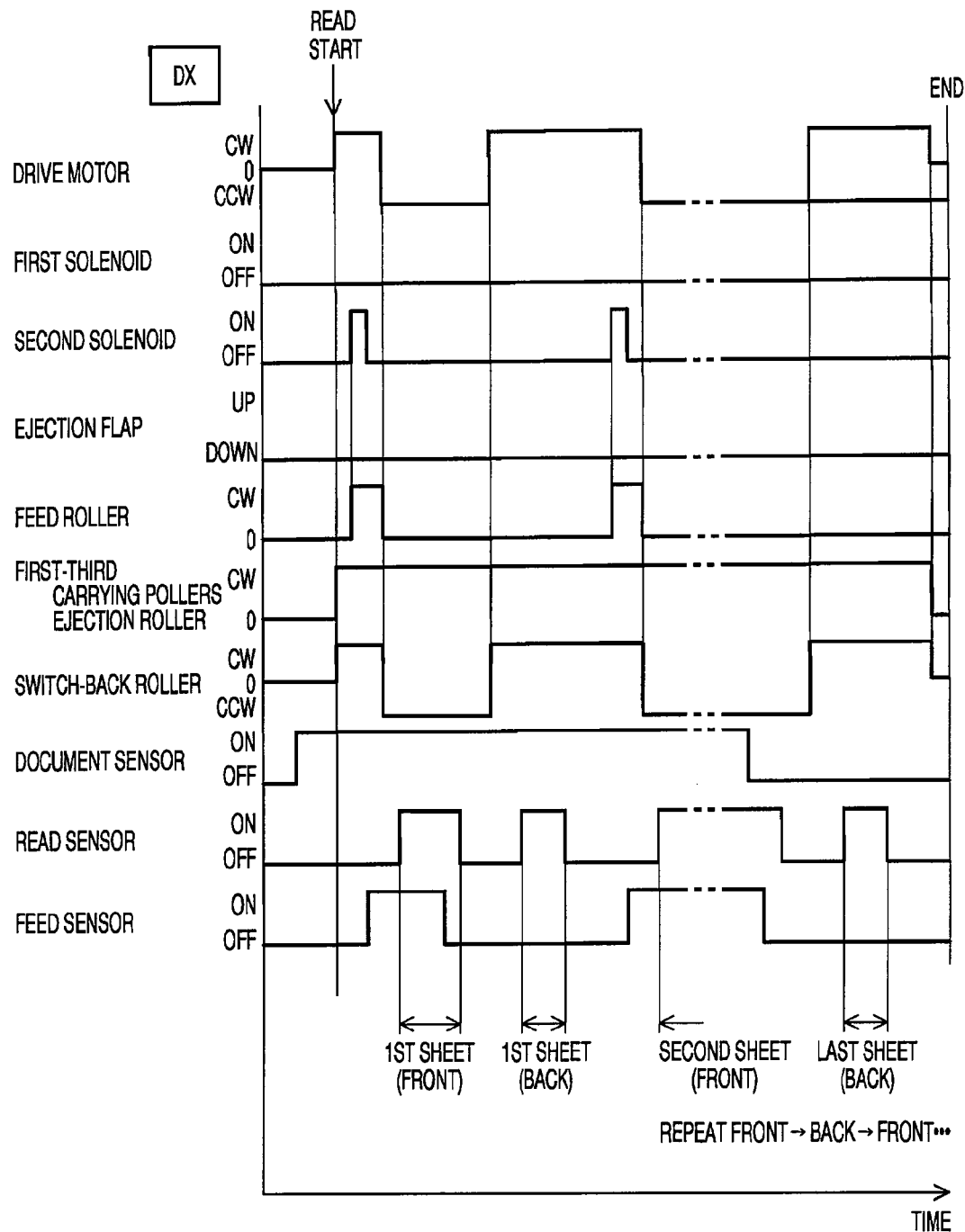
FIG. 17 is a timing chart for explaining a double-sided reading mode.

FIGS. 7-9 are explanatory illustrations for explaining carrying states in the ADF 120. FIG. 10 is a timing chart illustrating a single-side reading mode. FIGS. 11-16 are explanatory illustrations for explaining operations of the driving force switching mechanism 140 and the driving force distributing mechanism 150. FIG. 17 is a timing chart illustrating a double-sided reading mode.

As shown in FIG. 1, the image reading device 100 is provided with an image read window 102 (hereafter, referred to as a still read window 102) used for a still document reading function, and a image read window 103 (hereafter, referred to as an automatic read window 103) used for an automatic carrying and reading function. The still read window 102 and the automatic read window 103 are respectively sealed with transparent platens 102A and 103A made of glass or acrylic.

In this embodiment, the platens 102A and 103A are formed of a glass plate. That is, the two types of platens 102A and 103A are integrally formed of a glass plate. A document cover 104 for covering the windows 102 and 103 is pivotally provided on the upper side of a main body 101. Therefore, when the document reading is performed through the still reading window 102, a user opens the document cover 104 upward, and places a document on the still reading window 102.

In the main body 101, an image pick-up device 105 configured to emit light to illuminate the document and to generate an electric signal in accordance with the received light is provided. The image reading device 100 executes the reading operation by converting the image formed on the document into an electric signal through the image pick-up device 105.

In this embodiment, the image pick-up device 105 is formed of a CIS (Contact Image Sensor) configured to be elongated in a direction perpendicular to the moving direction thereof beneath the reading windows 102 and 103.

The image pick-up device 105 is mounted in the main body 101 to be movable along a longitudinal direction of the image reading device 100 (i.e., a left and right direction on FIG. 2). During execution of the automatic feed/read function, the image pick-up device 105 reads the image from the document while being fixed at the position beneath the automatic read window 103. On the other hand, when the still document read function is executed, the image pick-up device 105 reads the image from the document while being moved under the still read window 102.

At a portion of the document cover near the automatic read window 103, the ADF 120 configured to feed the document to the automatic read window 103 is provided.

The ADF 120 includes a document tray 121 on which a document to be read is placed. On the upper side of the document tray 121, an output tray 123 on which the document for which the image reading is completed is placed is provided. Regarding the document having a plurality of sheets of paper, such document is placed on the document tray or the output tray in a state where the plurality of sheets of paper are stacked in a vertical direction.

On the side of the document tray 121 nearer to the automatic read window 103, a feeder mechanism 125 is provided. The feeder mechanism 125 is configured to feed a plurality of documents placed on the document tray 121 one by one to the automatic read window 103 from the bottom of the stacked documents. More specifically, the feeder mechanism 125 includes a pick-up roller 125A, a nip piece 125B, a feed roller 125C and a separation pad 125D.

The pick-up roller 125 rotates and contacts the under surface of the document at the bottom of the document tray to carry the document to the side of the feed roller 125C. The nip piece 125B serves to press the document against the pick-up roller 125A.

The pick-up roller 125 rotates while being driven by the feed roller 125C via a driving force transmission mechanism such as a gear. Therefore, the pick-up roller 125A rotates in synchronism with the feed roller 125C.

Further, the feed roller 125C applies a carrying force to the document by rotating and contacting the under surface of the document as in the case of the feed roller 125A. The separation pad 125D contacts the document on the opposite side of the feed roller with respect to the document to apply carrying resistance to the document.

Therefore, only the document contacting the feed roller 125C is carried from the feed roller 125C, and other documents situated on the side of the separation pad 125D with respect to the document contacting the separation pad 125D are stopped by the carrying resistance from the separation pad 125D. Consequently, the documents placed on the document tray 121 are carried to the automatic read window 103 one by one from the bottom of the stacked documents.

A first carrying roller 126A carries the document from the feed roller 125C to the automatic read window 103 by rotating and contacting the document at the lower surface thereof. A pinch roller 126B is a presser roller pressing the document against the first carrying roller 126A. The pinch roller 126B is a driven roller driven by the document being carried.

A document sensor 128A is located on the upstream side of the feed roller 125C. The document sensor 128A detects whether the document is placed on the document tray 121. A feed sensor 128B is located on the downstream side of the feed roller 125C. The feed sensor 128B detects whether the document is fed from the feed roller 125C. A read sensor 128C is located on the upstream side of the automatic read window 103. The read sensor 128C detects whether the document is passing the automatic read window 103.

When the document is placed on the document tray 121, the document sensor 128A moves to a state indicated by a double chain line in FIG. 1, and outputs an ON signal. On the other hand, when no document is placed on the document tray 121, the document sensor 128A moves to a state indicated by a solid line in FIG. 1, and outputs an OFF signal.

Each of the feed sensor 128B and the read sensor 128C moves to a state indicated by a double chain line in FIG. 1 when the document is passing therethrough, and outputs an ON signal. On the other hand, each of the feed sensor 128B and the read sensor 128C moves to a state indicated by a solid line in FIG. 1 when no document is passing therethrough, and outputs an OFF signal.

At a position shifted to the downstream side from the platen 103A, a second carrying roller 129A for carrying the document which has passed the automatic read window 103 to the output tray 123 is provided. The document to which the carrying force is applied by the second carrying roller 129A is turned upward by 180 degrees and then is ejected to the output tray 123.

A pinch roller 129 serves as a presser roller which presses the document against the second carrying roller 129A. The pinch roller 129 is a driven roller which contacts the document and is driven by the document being carried.

A carrying path L0 on the downstream side of the second carrying roller 129A branches at a branch point P1 into a carrying path L1 on the lower side and a carrying path L2 on the upper side.

A reversing mechanism 127 is configured to reverse the carrying direction of the document which has passed the automatic read window 103 to carry again the document to the automatic read window 103. Specifically, the reversing mechanism 127 includes a switch-back roller 127A and a pinch roller 127B which presses the document against the switch back roller 127A.

When the rear edge of the document carried to the reversing mechanism 127 passes a branch point P2, the switch-back roller 127A rotates inversely to carry the document to a carrying path L3.

A third carrying roller 127C serves to carry the document carried to the carrying path L1 to the reversing mechanism 127. A pinch roller 127 serves as a presser roller which presses the document against the third carrying roller 127C. The pinch roller 127 is a driven roller which contacts the document and is driven by the document being carried.

For each of the branch points P1 and P2, a carrying flap for switching carrying paths is provided. Each carrying flap is moves by an actuator 202 (see FIG. 6).

The carrying path L2 which is formed by branching upward at the branch point P1 connects to an ejection opening 123A for ejecting the document for which the image reading is finished, to the output tray 123. At the portion of the ejection opening 123A, an ejection roller 130A for ejecting the document to the output tray 123 is provided. A pinch roller 130B serves as a presser roller which presses the document against the ejection roller 130A. The pinch roller 130B is a driven roller which contacts the document and is driven by the document being carried.

On the side of the ejection opening 123A on the output tray 123, a sinking mechanism 133 for sinking the document into the position between the documents already stacked on the output tray 123 and the output tray 123. Hereafter, such a sinking operation is referred to as sinking ejection.

The sinking mechanism 133 includes an ejection flap 133A for executing the sinking ejection, and a crank 133B for swinging the ejection flap 133A between a first position (indicated by a double chain in FIG. 1) and a second position (indicated by a solid line in FIG. 1).

At an edge of the ejection flap 133A, a projected part 133D for lifting the document on the output tray 123 on the side of the ejection opening 123A is provided.

When the ejection flap 133A is situated at the first position, the part of the document on the side of the ejection opening 123A with respect to the projected part 133D is lifted upward from the output tray 123. In this case, the document newly ejected from the ejection opening 123A contacts the part A at which the document is lifted (see FIG. 2).

Therefore, the document newly ejected from the ejection opening 123A contacts the under surface of the document in an acute angle at the bottom of the stacked documents on the output tray 123, and the document turns toward a flat part 133E to which the projected part 133D connects. Consequently, the document ejected from the ejection opening 123A sinks into the position between the bottom of the stacked documents on the output tray 123 and the surface of the output tray 123.

When the ejection flap 133A is situated at the second position, the document ejected from the ejection opening 123A is stacked on the documents already stacked on the output tray 123 (i.e., stacked on the top of the stacked documents) without being subjected to the sinking ejection. Hereafter, an ejection operation performed when the ejection flap 133A is situated at the second position is referred to as normal ejection.

In this embodiment, the first to third carrying rollers 123A, 129A and 127C, the ejection roller 130A, the feed roller 125C and the switch-back roller 127A are driven by a single motor.

The driving force switching mechanism 140 switches between transmitting a driving force to the first to third carrying rollers 123A, 129A and 127C, the ejection roller 130A, the feed roller 125C and the switch-back roller 127A and transmitting a driving force to the crank 133B as shown in FIG. 3.

The driving force transmitted to the side including the first carrying roller 126A is distributed to the side of the first to third carrying rollers 123A, 129A and 127C, the ejection roller 130A, the feed roller 125C and the side of the switch-back roller 127 by the driving force distributing mechanism 150.

The driving force distributed to the side of the feed roller 125C is transmitted to the feed roller 125C via the driving force transmission mechanism 160.

As shown in FIG. 3, the driving force switching mechanism 140 includes two input gears 141 and 145, four output gears 132, 143, 146 and 147, and a first solenoid 149.

The input gear 141 (hereafter, referred to as a roller side input gear 141) rotates by receiving a driving force from the drive motor 201 and serves to transmit the driving force to the side of the first carrying roller 126A. The output gears 142 and 143 engage with the roller side input gear 141 and rotate, and are configured to be able to swing about a rotation center O1 of the roller side input gear 141

Specifically, the output gear 142 (hereafter, referred to as a first roller side output gear 142) engages with the roller side input gear 141 on a side with respect to the rotation center O1 of the roller side input gear 141, and the output gear 143 (hereafter, referred to as a second roller side output gear 143) engages with the roller side input gear 141 on the other side with respect to the rotation center O1 of the roller side input gear 141.

That is, the first roller side output gear 142 engages with the roller side input gear 141 on the side of the rotation center O1, and is attached to a tip of a first arm 142A radially extending from the rotation center O1 so as to be able to swing about the rotation center O1.

Similarly to the first roller side output gear 142, the second roller side output gear 143 engages with the roller side input gear 141 on the side of the rotation center O1, and is attached to a tip of a second arm 143A radially extending from the rotation center O1 so as to be able to swing about the rotation center O1.

When one of the first roller side output gear 142 and the second roller side output gear 143 engages with a transmission gear 144 for transmitting the driving force to the side of the first carrying roller 126A, the driving force transmitted from the drive motor 201 to the roller side input gear 141 is transmitted to the transmission gear 144 and then is transmitted to the side of the first carrying roller 126A (the driving force distributing mechanism 150).

The force for swinging the first roller side output gear 142 and the second roller side output gear 143 is produced by the engaging pressure between the roller side input gear 141 and each of the first roller side output gear 142 and the second roller side output gear 143.

Therefore, when the roller side input gear 141 rotates counterclockwise, each of the first and second arms 142A and 143A rotates counterclockwise, the first roller side output gear 142 engages with the transmission gear 144, and the second roller side output gear 143 moves away from the transmission gear 144.

On the other hand, when the roller side input gear 141 rotates clockwise, each of the first and second arms 142A and 143A rotates clockwise, the second roller side output gear 143 engages with the transmission gear 144, and the first roller side output gear 142 moves away from the transmission gear 144.

When none of the first and second roller side output gears 142 and 143 engages with the transmission gear 144, the driving force transmitted to the roller side input gear 141 is not transmitted to the side of the first carrying roller 126 (driving force distributing mechanism 150). Hereafter, such a state is called a neutral state.

The first arm 142A and the second arm 143A are integrally formed such that they are joined together at the side of the rotation center O1. The joint part is provided with a first recessed part 149C with which a first engaging projection 149B provided at a tip of a first engaging arm 149A swung by the first solenoid 149 engages.

Therefore, when the first engaging projection 149B engages with the first recessed part 149C, the swinging motion of the first and second arms 142A and 143A is restricted, and none of the first roller side output gear 142 and the second roller side output gear 143 engages with the transmission gear 144.

When the first engaging projection 149B and the first recessed portion 149C are released with respect to each other, one of the first and second roller side output rollers 142 and 143 engages with the transmission gear 144 in accordance with the rotational direction of the roller side input gear 141, and therefore the driving force is transmitted to the driving force distributing mechanism 150.

A portion of the input gear 145 (hereafter, referred to as a flap side input gear 145) has substantially the same structure as the portion of the roller side input gear 141.

The flap side input gear 145 rotates by receiving a driving force from the drive motor 201 and serves to transmit the driving force to the side of the crank 133B to swing the ejection flap 133A. The output gears 146 and 147 engage with the flap side input gear 145 and rotate, and are configured to be able to swing about a rotation center O2 of the flap side input gear 141.

Specifically, the output gear 146 (hereafter, referred to as a flap side output gear 146) engages with the flap side input gear 141 on a side with respect to the rotation center O2 of the flap side input gear 145, and the output gear 147 (hereafter, referred to as a second flap side output gear 146) engages with the flap side input gear 145 on the other side with respect to the rotation center O2 of the flap side input gear 145.

That is, the first flap side output gear 146 engages with the flap side input gear 145 on the side of the rotation center O2, and is attached to a tip of a first arm 146A radially extending from the rotation center O2 so as to be able to swing about the rotation center O2.

Similarly to the first flap side output gear 146, the second flap side output gear 147 engages with the flap side input gear 145 on the side of the rotation center O2, and is attached to a tip of a second arm 147A radially extending from the rotation center O2 so as to be able to swing about the rotation center O2.

When one of the first flap side output gear 146 and the second flap side output gear 147 engages with a transmission gear 148 for transmitting the driving force to the crank 133B, the driving force transmitted from the drive motor 201 to the flap side input gear 145 is transmitted to the transmission gear 148 and then is transmitted to the crank 133B.

Therefore, when the flap side input gear 145 rotates counterclockwise, each of the first and second arms 146A and 147A rotates counterclockwise, the first flap side output gear 146 engages with the transmission gear 148, and the second flap side output gear 147 moves away from the transmission gear 148.

On the other hand, when the flap side input gear 145 rotates clockwise, each of the first and second arms 146A and 147A rotates clockwise, the second flap side output gear 147 engages with the transmission gear 148, and the first flap side output gear 146 moves away from the transmission gear 148.

When none of the first and second flap side output gears 146 and 147 engages with the transmission gear 148, the driving force transmitted to the flap side input gear 145 is not transmitted to the crank 133B. Consequently, the first and second flap side output gears 146 and 147 move to a neutral state.

The first arm 146A and the second arm 147A are integrally formed such that they are joined together at the side of the rotation center O2. The joint part is provided with a second recessed part 149F with which a second engaging projection 149E provided at a tip of a second engaging arm 149D swung by the first solenoid 149 engages.

Therefore, when the second engaging projection 149E engages with the second recessed part 149F, the swinging motion of the first and second arms 146A and 147A is restricted, and none of the first flap side output gear 146 and the second flap side output gear 147 engages with the transmission gear 148.

When the second engaging projection 149E and the second recessed portion 149F are released with respect to each other, one of the first and second flap side output rollers 146 and 147 engages with the transmission gear 148 in accordance with the rotational direction of the flap side input gear 145, and therefore the driving force is transmitted to the crank 133B.

The first engaging arm 149A and the second engaging arm 149D are controlled such that the second recessed part 149F and the second engaging projection 149E are released with respect to each other when the first recessed part 149C engages with the first engaging projection 149B, while the second recessed part 149F engages with the second engaging projection 149E when the first recessed part 149C and the first engaging projection 149B are released with respect to each other.

In other words, the first solenoid 149 controls the engaging state such that one of a group of the output gears 142 and 143 corresponding to the roller side input gear 145 and a group of output gears 146 and 147 corresponding to the flap side input gear 148 is set to be able to swing and the other of the groups is set not to be able to swing.

It is preferable that when the output gears 142 and 143 of the roller side input gear 141 move to the neutral state from a state of engaging with the transmission gear 144 or when the output gears 146 and 147 of the flap side input gear 145 move to the neutral state from a state of engaging with the transmission gear 148, the first solenoid 149 is activated slightly after inversing the rotational direction of the drive motor 201.

The driving force distributing mechanism 150 includes a gear 151 which rotates by receiving the driving force from the transmission gear 144 of the driving force switching mechanism 140, and first and second input gears 152 and 153 each of which constantly engages with the gear 151.

The first input gear 152 transmits the driving force to the side of the first to third carrying rollers 1226A, 129A and 127C, and the ejection roller 130A. The second input gear 157 transmits the driving force to the switch-back roller 127A.

A first output gear 153 engages with a gear formed at the center of the first input gear 152, and is configured to be able to swing about the rotation center of the first input gear 152.

Each of a first transmission gear 154 and a second transmission gear 155 transmits the driving force from the first output gear 153 to a first output transmission gear 156 when engaging with the first output gear 153. The first output transmission gear 156 transmits the driving force to the first to third carrying rollers 126A, 129A and 127C and the ejection roller 130A.

Since the first output gear 153 is able to swing about the rotation center of the first input gear 152, the first output gear 153 engages with the first transmission gear 154 when the first input gear 152 rotates clockwise, while the first input gear 153 engages with the second transmission gear 155 when the first input gear 152 rotates counterclockwise.

Therefore, when the first input gear 152 rotates clockwise, the driving force from the transmission gear of the driving force switching mechanism 140 is transmitted in the order of, the first input gear 152, the first transmission gear 154, and the first output transmission gear 156.

On the other hand, when the first input gear 152 rotates counterclockwise, the driving force from the transmission gear 144 of the driving force switching mechanism 140 is transmitted in the order of the first input gear 152, the second transmission gear 155, the first transmission gear 154 and the first output transmission gear 156. That is, the first output transmission gear 156 rotates in a constant rotational direction regardless of the rotational direction of the first input gear 152.

A second output gear 158 engages with a gear provided at the center of a second input gear 157, and is able to swing about a rotation center of the second input gear 157 the second output transmission gear 159 transmits the driving force to the switch-back roller 127A.

Since the second output gear 158 is able to swing about the rotation center of the second input gear 157, the second output gear 158 engages with the second output transmission gear 159 on a side of the second output transmission gear 159 when the second input gear 157 rotates clockwise, and the second output gear 158 engages with the second output transmission gear 159 on the other side of the second output transmission gear 159 when the second input gear 157 rotates counterclockwise. Therefore, the rotational direction of the second output transmission gear 159 changes depending on the rotational direction of the second input gear 157.

The driving force transmission mechanism 160 serves as a clutch mechanism for engaging and disengaging of the driving force to be transmitted to the feed roller 125C from the drive motor 201.

An input gear 161 rotates in cooperation with the drive motor 201 by receiving the driving force from the drive motor 201. An output gear 162 engages with a gear formed at the center of the input gear 161, and is configured to be able to swing about the rotation center of the input gear 161. An output transmission gear 163 transmits the driving force to the feed roller 125C.

Therefore, when the input gear 161 rotates clockwise, the output gear 162 swings rightward and engages with the output transmission gear 163. In this case, the driving force is transmitted in order of the input gear 161→the output gear 162→the output transmission gear 163. Consequently, the feed roller 125C rotates.

At a swinging center of an arm 162A pivotally supporting the output gear 162, a recessed part 162B to be engaged with an engaging projection 164B provided at a tip of an engaging arm 164A swung by the second solenoid 164 is provided.

Therefore, when the engaging projection engages with the recessed part 162B, the swinging motion of the arm 162A is restricted at the neutral state, and the output gear 162 moves to a state of not engaging with the output transmission gear 163.

When the engaged state of the engaging projection 164B and the recessed part 162B is released, the output gear 162 swings around the input gear 161 depending on the rotational direction of the input gear 161, by which the transmission of the driving force is controlled on an intermittent basis.

Hereafter, the control system of the ADF 120 is explained with reference to FIG. 6. As shown in FIG. 6, output signals from the document sensor 128A, the feed sensor 128B and the read sensor 128C are inputted to a controller 200. The controller 200 controls various internal components including the drive motor 201 and the actuator 202 for driving the carrying flaps in accordance with programs stored thereon.

The controller 200 is, for example, a microcomputer chip in which a CPU, a ROM and a RAM are embedded. The programs for executing processes shown as timing charts in FIGS. 10 and 17 are stored on the ROM. The CPU executes control processes by reading the programs from the ROM.

On the upper front portion of the image reading device 100, an operation panel 20 for operating and setting the image reading device 100 is provided. The controller 200 also controls the operation panel 203.

Hereafter, the carrying control operation is explained. As described in detail below, the ADF 120 is configured to be able to execute the single-side reading and the double-sided reading. In the following, a general operation of the ADF 120 is explained first.

Hereafter, the single-side reading is explained.

When the user selects the single-side reading mode through the operation panel 203, the document is carried as indicated by a thick arrow in FIG. 7, and the document is ejected to the output tray 123 in the sinking ejection.

More specifically, when a read start button (not shown) is pressed by the user in a state where a plurality of documents are placed on the document tray 121 such that a reading surface of each document faces downward, the drive motor 201 starts to rotate, and the documents stacked on the document tray 121 are fed to the automatic read window 103 one by one from the document at the bottom of the stacked document on the document tray 121 so as to start the image reading.

When the single-side reading mode is selected by the user, the controller 200 activates the actuator 202 for the carrying flap and moves the ejection flap 133A to the first position so that the document which has fed from the document tray 121 and which has passed the automatic read window 103 is ejected from the ejection opening 123A through the carrying path L0 and the carrying path L2.

Therefore, the documents for which the image reading is finished are stacked on the output tray 123 one by one such that the document sinks into the position between the bottom of the stacked document already stacked on the output tray 123 and the surface of the output tray 123.

Therefore, in the single-side reading mode, the documents are stacked one by one on the output tray from the bottom to the top such that the reading surface of each document faces upward. That is, in the single-side reading mode, the documents stacked on the document tray 121 are placed on the output tray 123 in a flipped state.

Hereafter, the double-sided reading mode is explained.

When the double-sided reading mode is selected by the user through the operation panel 203, the document is carried as indicated by a thick arrow shown in FIG. 8 first. Then, the carrying direction is reversed by the reversing mechanism 127, and the document is carried as indicated by a thick arrow shown in FIG. 9 so as to read the back-face of the document, and thereafter the document is ejected to the output tray 123 via the ejection opening 123A in the normal ejection.

Specifically, when the read start button is pressed by the user in a state where the reading surface of each document faces downward and a plurality of documents are placed on the document tray 121, the drive motor 201 starts to rotate, and the documents stacked on the document tray 121 are fed to the automatic read window 103 one by one from the document at the bottom of the stacked document on the document tray 121 so as to start the image reading.

When the double-sided reading mode is selected by the user, the controller 200 activates the actuator 202 for the carrying flap so that the document which has passed the automatic read window 103 is carried to the reversing mechanism 217 via the carrying path L1, and moves the ejection flap 133A to the second position.

Therefore, the document for which the image reading is finished is carried along the carrying path L1 to the reversing mechanism 127 as indicated by a thick arrow shown in FIG. 8. When the rear edge of the document passes the branching point P2, the controller 200 activates the actuator 202 for the carrying flap and inverses the rotational direction of the reversing mechanism 127 so that the document of which carrying direction is reversed is carried to the carrying path L3.

Therefore, as shown in FIG. 9, the document of which front-face has been read is carried again to the automatic read window 103 to read the back-face of the document. Then, the document for which the image reading is finished is ejected to the output tray 123 via the ejection opening 123A.

At this time, the document being ejected to the output tray 123 is stacked on the documents already stacked on the output tray 123. Therefore, in the double-sided reading mode, the documents are stacked on the output tray 123 from the bottom to the top one by one such that each front-face faces downward. That is, in the double-sided reading mode, the plurality of documents stacked on the document tray 121 is placed on the output tray 123 as it is.

Timings of driving of the drive motor and the first and second solenoids will now be explained.

As shown in FIG. 10, the activations of the drive motor 201 and the first and second solenoids 149 and 164 are controlled based on the timing of the output signals from the document sensor 128A and the read sensor 128C. In FIG. 10, the numeric symbols FIGS. 11, 12, 13, 14, 15 and 16 corresponds to the activating states of the driving force switching mechanism 140 and the driving force transmission mechanism 160 shown in FIGS. 11, 12, 13, 14, 15 and 16, respectively.

Before the read start button provided on the operation panel 203 is operated by the user (i.e., in an initial state where the image reading is not executed), the ejection flap 1333A is set in the normal ejection state (second position), the output gears 142 and 143 of the roller side input gear 141 are set to be able to swing, and the output gears 146 and 147 of the flap side input gear 145 are set to the neutral state where the swinging is impossible.

Figure 12:
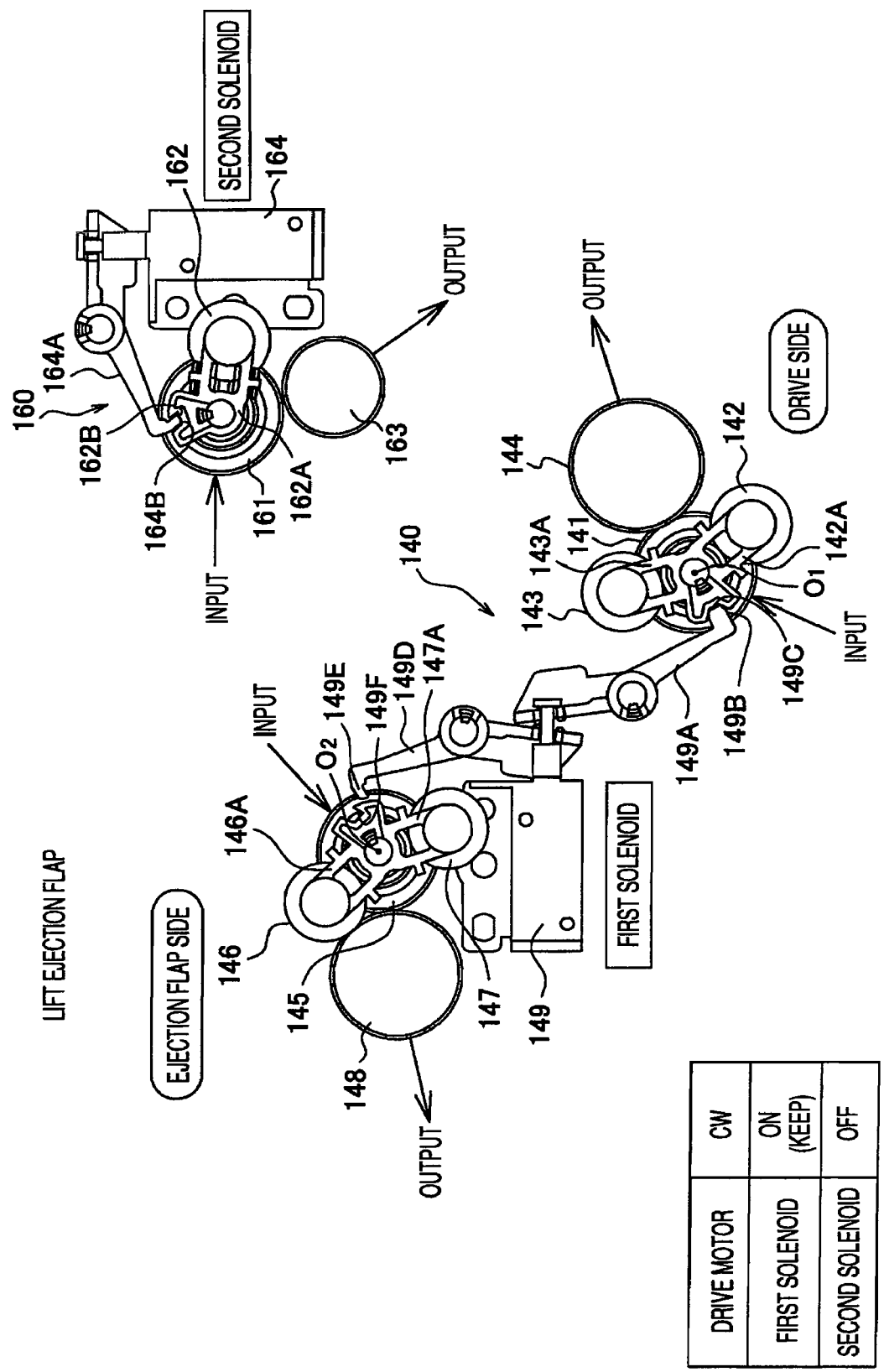

When the read start button is pressed and the image reading is started, the drive motor 201 starts to rotate (in clockwise direction), and the first solenoid 149 is moved to the ON state, the output gears 142 and 143 of the roller side input gear 141 in the driving force switching mechanism 140 are set to the neutral state (where the swinging is impossible), and the output gears 146 and 147 of the flap side input gear 145 are set to be able to swing (see FIG. 12).

In this state, since the driving force of the drive motor 201 is transmitted to the crank 133B, the ejection flap 133A starts to move to the first position from the second position. When the ejection flap 133A moves to the first position, the drive motor 201 is driven inversely for a predetermined time (in the counterclockwise direction) and the first solenoid 149 is set to OFF.

Figure 13:
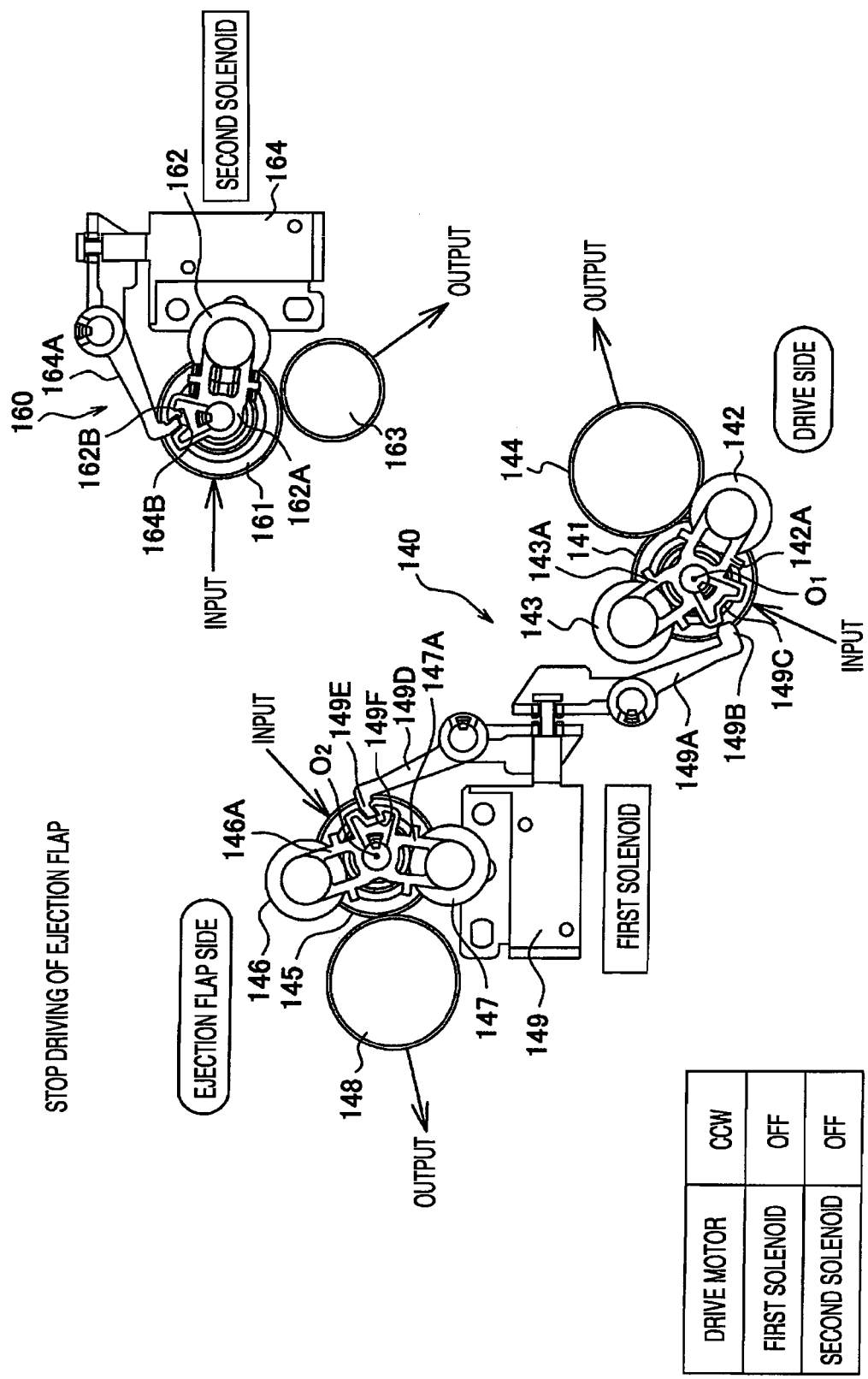

Therefore, the engaged state of the transmission gear 148 and the first flap side output gear 146 is released, the output gears 146 and 147 are moved to the neutral state, and the output gears 142 and 143 are moved to the state of being able to swing (see FIG. 13).

Since the drive motor 201 is rotating inversely, the transmission gear 144 and the first roller side output gear 142 engages with each other. However, since the first output transmission gear 156 rotates constantly in the same rotational direction regardless of the rotational direction of the driving force transmitted to the driving force distributing mechanism 150 from the driving force switching mechanism 140, the rollers including the first carrying roller 126A rotate normally to carry the document properly regardless of the rotational direction of the drive motor 201.

Figure 14:
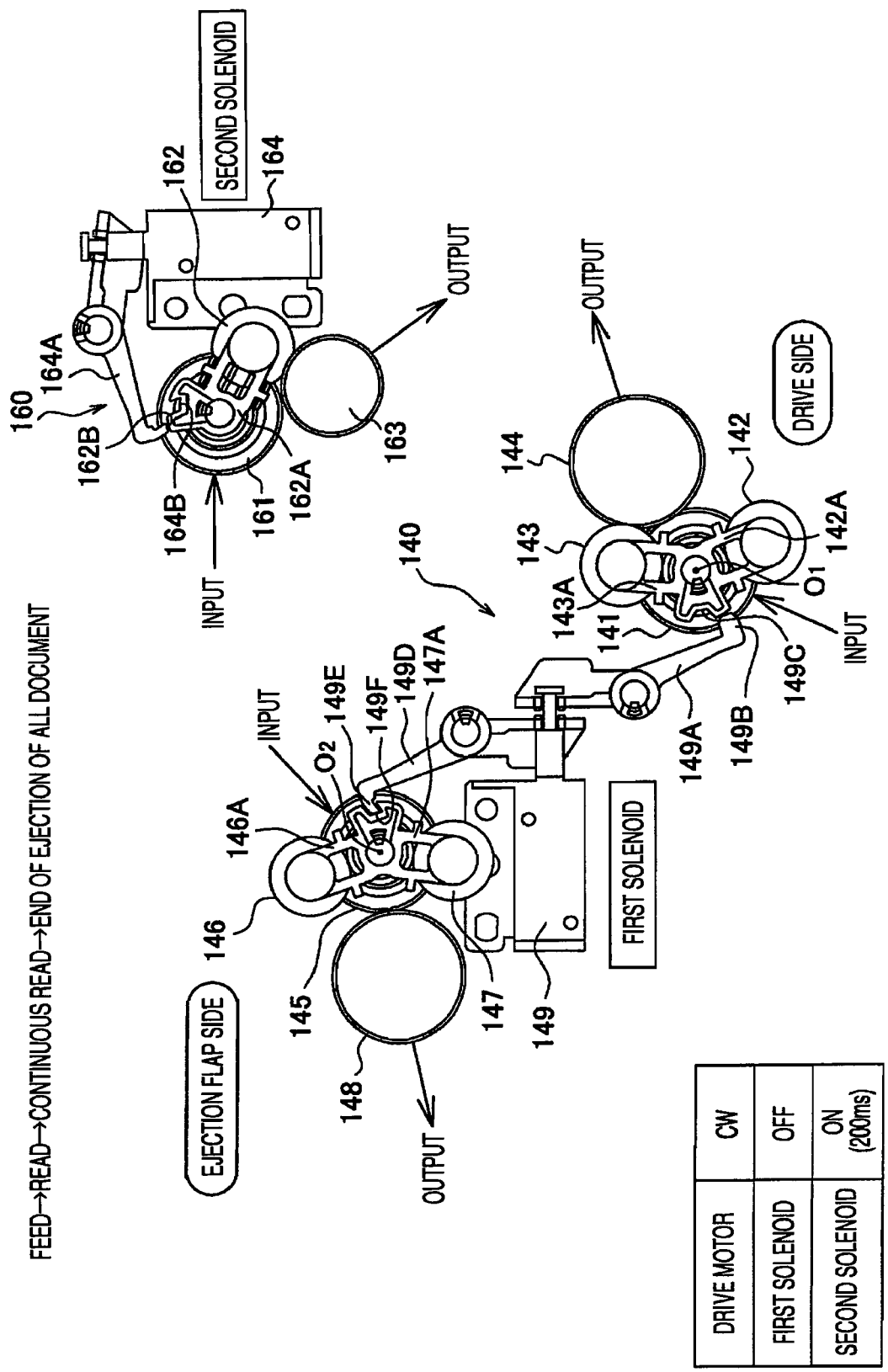

Next, when a predetermined time has elapsed from the state where the output gears 146 and 147 move to the neutral state and the output gears 142 and 143 are set to the state of being able to swing, the drive motor 201 starts to rotate normally, the transmission gear 144 and the second roller side output gear 143 engage with each other, so that the driving force is transmitted to the rollers including the first carrying roller 126A, the second solenoid 164 is set to ON, and the driving force is transmitted to the feed roller 125C (see FIG. 14).

Then, the document is carried to the automatic read window 103 to execute the image reading, and the document is ejected to the output tray 123 in the sinking ejection mode. When both of the document sensor 128A and the read sensor 128C are set to the OFF state, it is judged that all the documents have been read.

Figure 15:
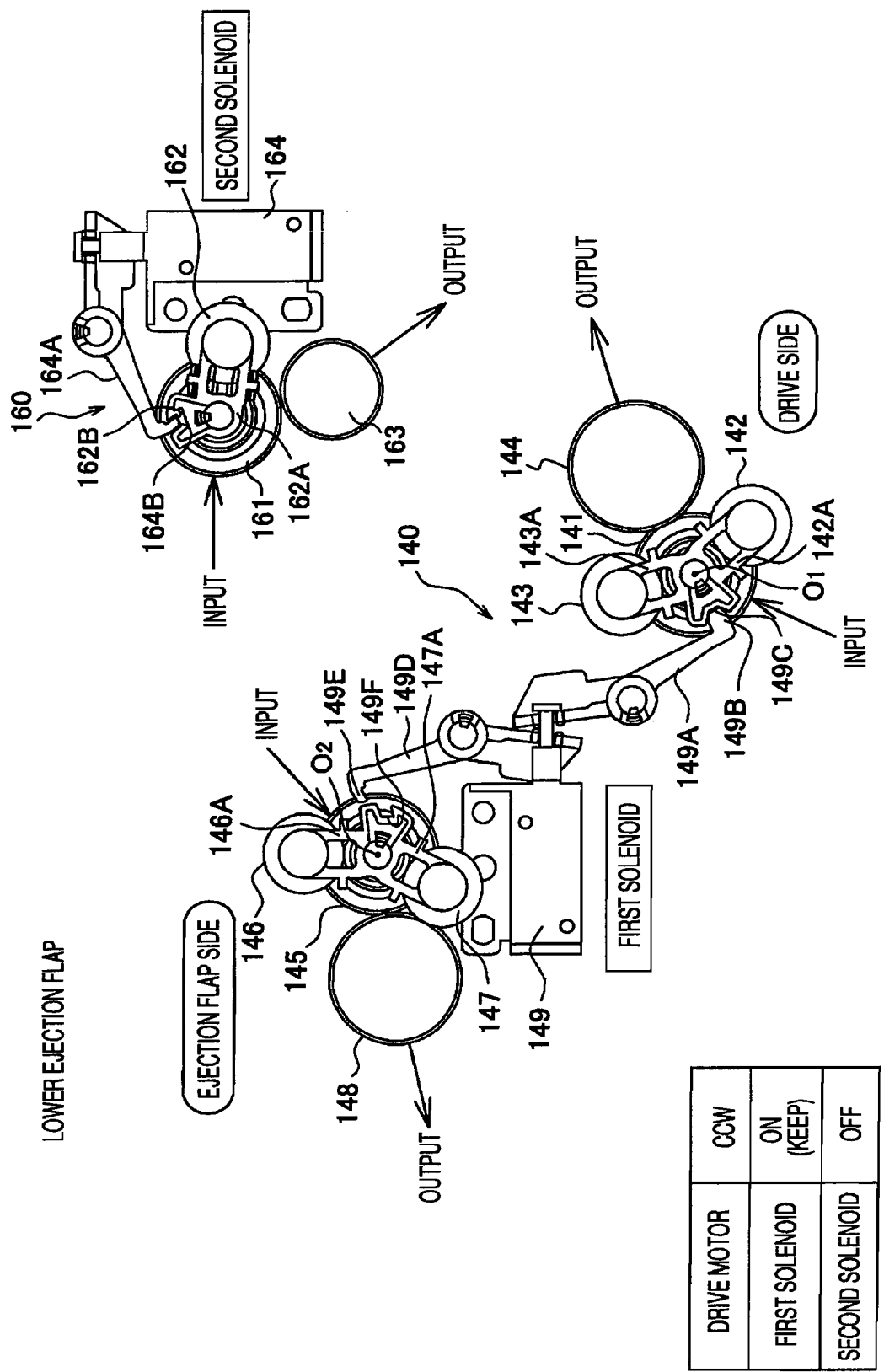
Figure 16:
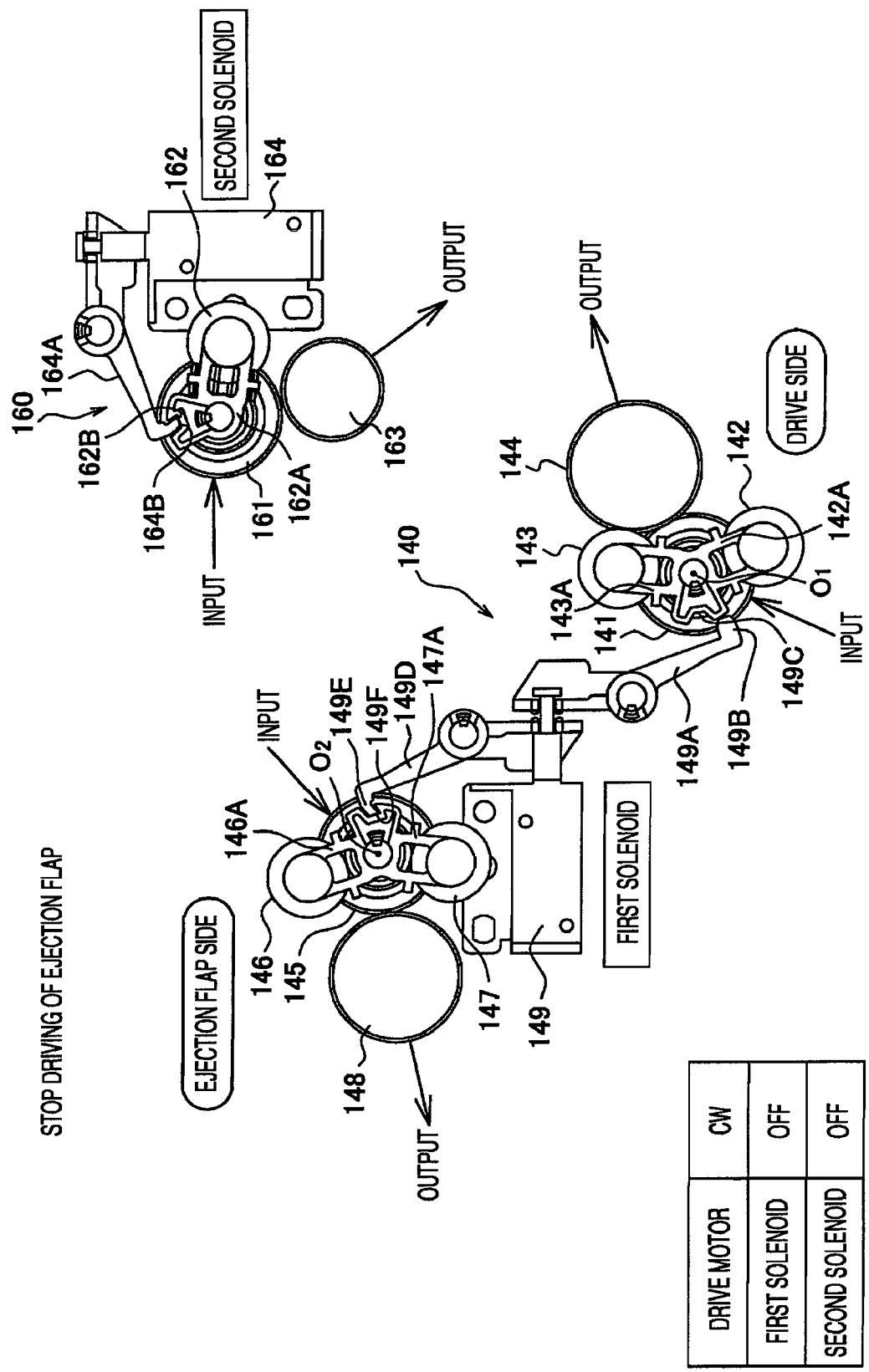

Next, in the state where the second solenoid 164 moves to the OFF state, the driving force to the feed roller 125 is cut off, and drive motor 201 is rotated inversely, the first solenoid 149 is moved to the ON state, the then the output gears 142 and 143 of the roller side input gear 141 are moved to the neutral state, and the output gears 146 and 147 of the flap side input gear 145 are set to be able to swing (see FIG. 15).

At this time, since the drive motor 201 rotates inversely, the ejection flap 133A moves to the second position from the first position. When the ejection flap 133A moves to the second position, the drive motor 201 is rotated normally for a predetermined time and the first solenoid 149 moves to the OFF state.

Hereafter, the double-sided reading mode is explained.

In the double-sided reading mode, since it is possible to execute the image reading while keeping the ejection flap 133A at the second position (the initial position), the image reading is executed in a state where the first solenoid 149 is kept in the OFF state.

In this embodiment, driving of the drive motor 201 is changed from the normal rotation to the reversed rotation when a predetermined time has elapsed from the time when the feed sensor 128B moves to the OFF state from the ON state. Thereafter, the driving of the drive motor 201 is changed from the inverse rotation to the normal rotation, when a predetermined time has elapsed from the time when the feed sensor moves to the ON state to the OFF state.

As described above, in this embodiment, the driving state is switched between the state of transmitting the driving force of the drive motor 201 to the rollers including the first carrying roller 123A and the state of transmitting the driving force of the drive motor 201 to the ejection flap 133A. Therefore, the driving force of the drive motor 201 is transmitted to only one of the rollers including the first carrying roller 126A and the ejection flap 13A. In other words, both of the ejection flap 133A and the rollers including the first carrying roller 126A are not driven simultaneously. Such a configuration eliminates the need for employing a drive motor having a large size. Consequently, the cost for the ADF can be reduced.

In this embodiment, the driving force switching mechanism 140 switches between a driving state of driving the output gears 142 and 143 to be able to swing and a driving state of driving the output gear 146 and 147 to be able to swing through the first solenoid 140. Such a configuration makes it possible to suppress increase of the number of parts in the ADF 120.

Although the present invention has been described in considerable detail with reference to certain preferred embodiments thereof, other embodiments are possible.

In the above described embodiment, the driving force switching mechanism 140 is configured to include the first solenoid 149, the output gears 142, 143, 146 and 147. However, the structure of the driving force switching mechanism 140 is not limited to such a configuration. Various types of mechanisms can be employed for achieving the function of the driving force switching mechanism 140.

In the above described embodiment, the sinking ejection is used in the single-side reading mode. However, the ADF may be configured to execute the sinking ejection in the double-sided reading mode.

In the above described embodiment, the technical feature is applied to the image reading device capable of executing both of the single-side reading mode and the double-sided reading mode. However, the image reading device is not limited to such a configuration.

What is claimed is:

1. An automatic document feeder, comprising:
    a document tray on which a document to be read is placed;
    an output tray on which the document for which image reading is finished is placed;
    a roller which applies a carrying force to the document by rotating and contacting the document;
    a movable ejection flap configured to be movable between a first position where the document for which the image reading is finished is sunk into a position between the output tray and a bottom of a stacked document already stacked on the output tray and a second position where the document is ejected on the output tray without being sunk into the position between the output tray and the bottom of the stacked document;
    a driving source configured to transmit a driving force to the roller and the movable ejection flap; and
    a switching unit configured to switch between a first motion of transmitting the driving force of the driving source to the movable ejection flap and a second motion of transmitting the driving force of the driving source to the roller.

2. The automatic document feeder according to claim 1, wherein the switching unit comprises:
    an input gear which rotates by receiving the driving force from the driving source;
    at least one output gear which rotates and engages with the input gear and is able to swing with respect to a rotation center of the input gear; and
    a solenoid which switches between a motion of enabling the output gear to swing and a motion of disabling the output gear to swing.

3. The automatic document feeder according to claim 2, wherein the at least one output gear comprises:
    a first output gear which engages with the input gear on one side with respect to the rotation center of the input gear; and
    a second output gear which engages with the input gear on the other side with respect to the rotation center of the input gear.

4. The automatic document feeder according to claim 1, wherein the switching unit comprises:
    a roller side input gear which rotates by receiving the driving force from the driving source to transmit the driving force to the roller;
    a roller side output gear which rotates and engages with the roller side input gear and is able to swing with respect to a rotation center of the roller side input gear;
    a flap side input gear which rotates by receiving the driving force from the driving source to transmit the driving force to the movable ejection flap;
    a flap side output gear which rotates and engages with the flap side input gear and is able to swing with respect to a rotation center of the flap side input gear; and
    a solenoid which switches between a motion of enabling the roller side output gear to swing and a motion of enabling the flap side output gear to swing,
    wherein the driving force is transmitted through one of the roller side output gear and the flap side output gear set to swing by the solenoid.

5. The automatic document feeder according to claim 1, further comprising a reversing mechanism configured to reverse a carrying direction of the document which has passed a reading portion to carry again the document to the reading portion,
    wherein the switching unit executes a switching operation in accordance with whether the reversing mechanism is activated.

6. An automatic document feeder according to claim 1, wherein, in the first motion of transmitting the driving force of the driving source to the movable ejection flap, the driving force of the driving source is transmitted to the movable ejection flap so that the movable ejection flap moves between the first position and the second position.

7. An image reading device, comprising:
    an automatic document feeder; and
    a reading portion configured to read a document carried to the reading portion,
    wherein the automatic document feeder comprises:
    a document tray on which a document to be read is placed;
    an output tray on which the document for which image reading is finished is placed;
    a roller which applies a carrying force to the document by rotating and contacting the document;
    a movable ejection flap configured to be movable between a first position where the document for which the image reading is finished is sunk into a position between the output tray and a bottom of a stacked document already stacked on the output tray and a second position where the document is ejected on the output tray without being sunk into the position between the output tray and the bottom of the stacked document;
    a driving source configured to transmit a driving force to the roller and the movable ejection flap; and
    a switching unit configured to switch between a first motion of transmitting the driving force of the driving source to the movable ejection flap and a second motion of transmitting the driving force of the driving source to the roller.

8. The image reading device according to claim 7, wherein the switching unit comprises:
- an input gear which rotates by receiving the driving force from the driving source;
- at least one output gear which rotates and engages with the input gear and is able to swing with respect to a rotation center of the input gear; and
- a solenoid which switches between a motion of enabling the output gear to swing and a motion of disabling the output gear to swing.

9. The image reading device according to claim 8, wherein the at least one output gear comprises:
- a first output gear which engages with the input gear on one side with respect to the rotation center of the input gear; and
- a second output gear which engages with the input gear on the other side with respect to the rotation center of the input gear.

10. The image reading device according to claim 7, wherein the switching unit comprises:
- a roller side input gear which rotates by receiving the driving force from the driving source to transmit the driving force to the roller;
- a roller side output gear which rotates and engages with the roller side input gear and is able to swing with respect to a rotation center of the roller side input gear;
- a flap side input gear which rotates by receiving the driving force from the driving source to transmit the driving force to the movable ejection flap;
- a flap side output gear which rotates and engages with the flap side input gear and is able to swing with respect to a rotation center of the flap side input gear; and
- a solenoid which switches between a motion of enabling the roller side output gear to swing and a motion of enabling the flap side output gear to swing,
- wherein the driving force is transmitted through one of the roller side output gear and the flap side output gear set to swing by the solenoid.

11. The image reading device according to claim 7,
wherein the automatic document feeder further comprising a reversing mechanism configured to reverse a carrying direction of the document which has passed the reading portion to carry again the document to the reading portion,
wherein the switching unit executes a switching operation in accordance with whether the reversing mechanism is activated.

* * * * *